(12) United States Patent
Robbins

(10) Patent No.: US 7,931,325 B2
(45) Date of Patent: Apr. 26, 2011

(54) WINDSHIELD ICE REMOVAL DEVICE

(76) Inventor: Leslie D. Robbins, Anaheim, CA (US)

( * ) Notice: Subject to any disclaimer, the term of this patent is extended or adjusted under 35 U.S.C. 154(b) by 0 days.

(21) Appl. No.: 10/439,144

(22) Filed: May 16, 2003

(65) Prior Publication Data

US 2004/0227373 A1    Nov. 18, 2004

(51) Int. Cl.
*B60J 1/20* (2006.01)
(52) U.S. Cl. .................................. 296/95.1; 296/136.13
(58) Field of Classification Search .................. 296/95.1, 296/136.01, 136.07, 136.08, 136.1, 136.13; 160/370.21
See application file for complete search history.

(56) References Cited

U.S. PATENT DOCUMENTS

| | | | |
|---|---|---|---|
| 2,551,052 A * | 5/1951 | Quish et al. ............. | 160/370.21 |
| 2,599,066 A | 6/1952 | Osborn | |
| 2,624,406 A * | 1/1953 | Szychowski et al. ..... | 160/370.21 |
| 2,690,928 A | 10/1954 | Boynes | |
| 3,046,048 A | 7/1962 | Cheney | |
| 4,815,784 A * | 3/1989 | Zheng ...................... | 160/370.21 |
| 5,024,262 A * | 6/1991 | Huang ...................... | 160/370.21 |
| 5,035,460 A * | 7/1991 | Huang ...................... | 296/95.1 |
| 5,037,156 A | 8/1991 | Lundberg | |
| 5,436,044 A * | 7/1995 | Pinkos ........................ | 428/36.1 |
| 5,615,923 A | 4/1997 | Madison | |
| 6,325,121 B1 * | 12/2001 | Hudnall ..................... | 296/95.1 |
| 6,485,086 B2 * | 11/2002 | McGrath, Jr. ............. | 296/95.1 |

* cited by examiner

*Primary Examiner* — Lori L. Coletta
(74) *Attorney, Agent, or Firm* — Leonard Tachner

(57) ABSTRACT

A windshield protection and ice removal device comprises a pair of generally rectangular flexible wire frames enclosed by and supporting a nylon fabric coated by an outer layer of polyvinyl chloride. There are also a pair of opposed side view mirror "gloves" having expandable "wrists" and which are designed to enclose a vehicle's side view mirrors for securing the invention to the vehicle in a manner resistant to wind effects which might otherwise lift the cover from the windshield. Finally, the preferred embodiment also comprises a wire-connected belt terminating in a buckle which is designed to be trapped inside a vehicle's interior by the vehicle's door or side window to render the invention resistant to unauthorized removal from the vehicle's windshield. A relatively thick, cut-resistant wire runs through the belt to make it more difficult to cut the belt and sever it from the rest of the shield device.

15 Claims, 3 Drawing Sheets

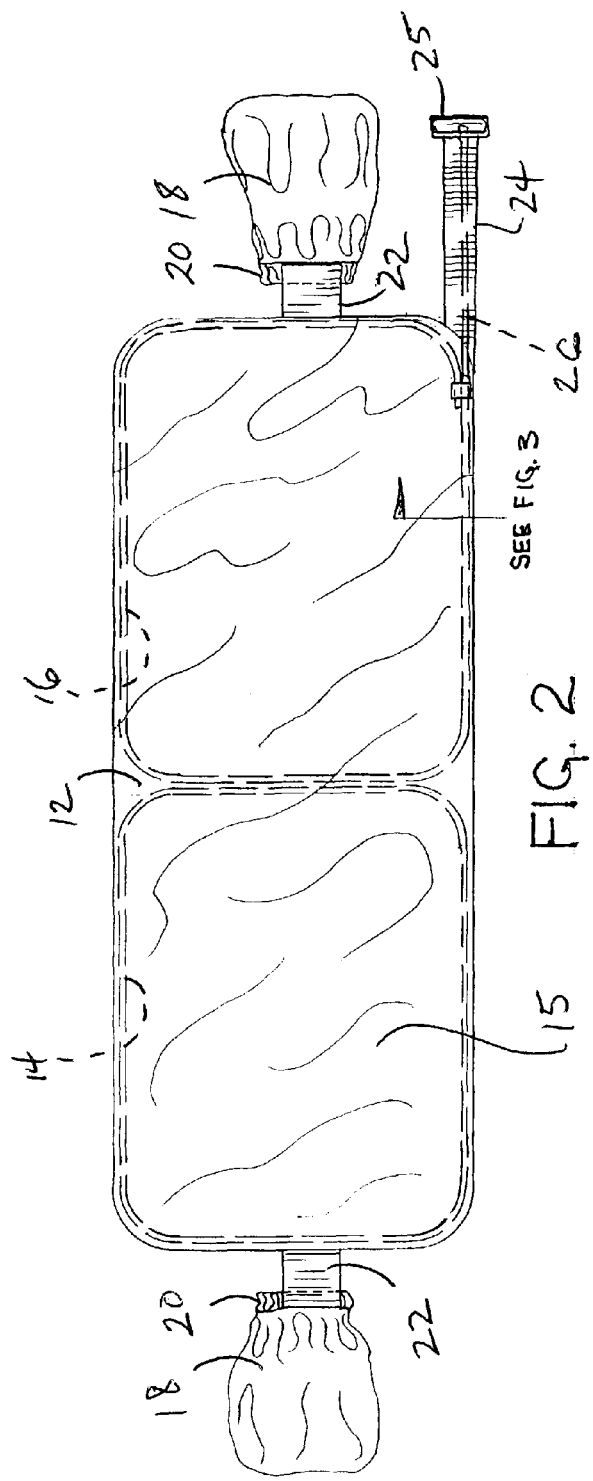
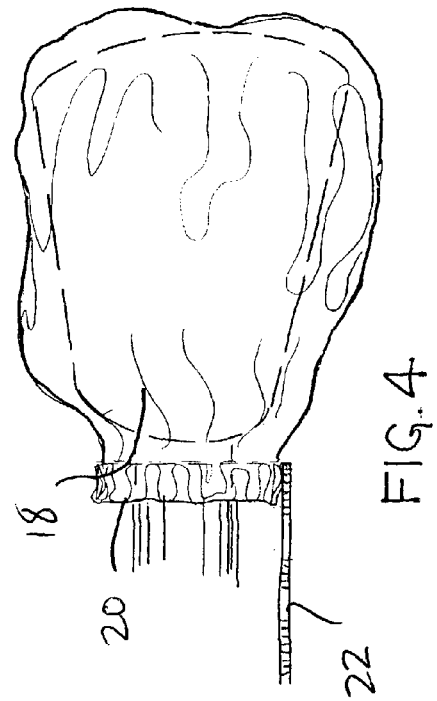
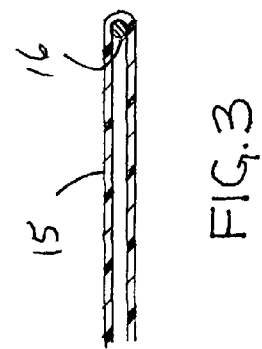

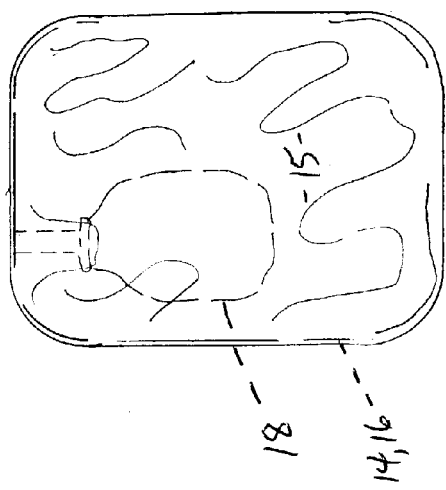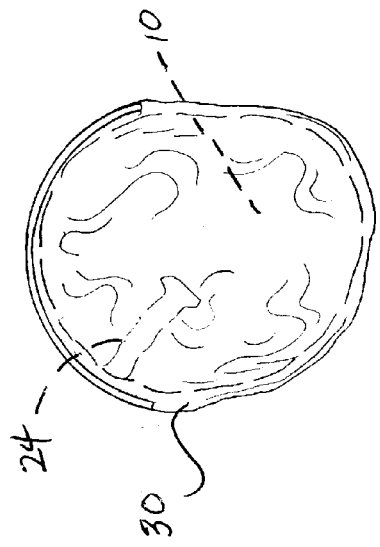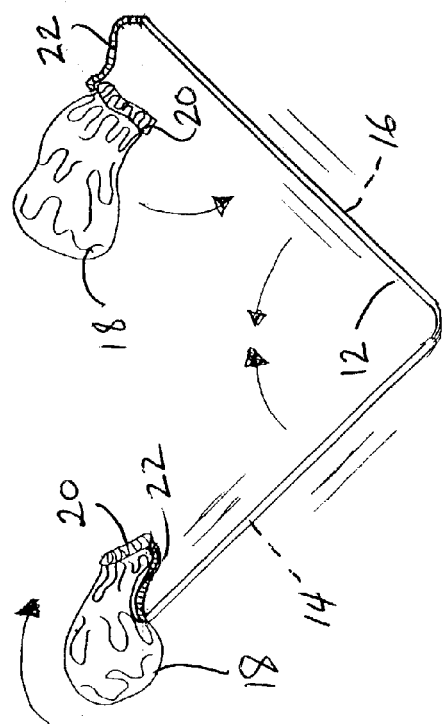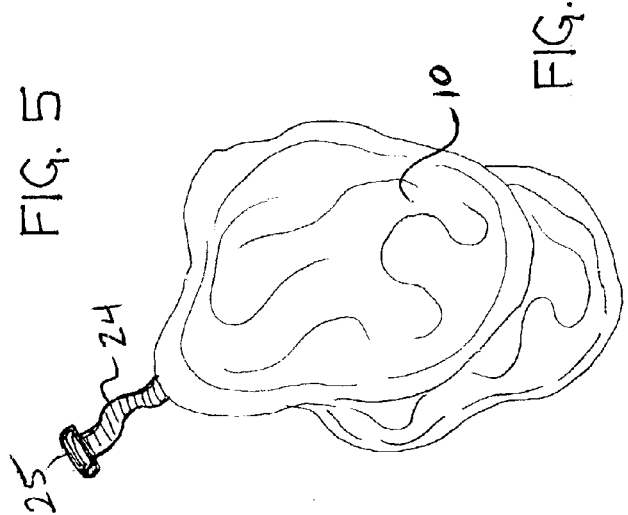

WINDSHIELD ICE REMOVAL DEVICE

BACKGROUND OF THE INVENTION

1. Field of the Invention

The present invention relates generally to devices which protect vehicle windshields from the accumulation of ice and snow and more particularly to a foldable shield designed to overlie a windshield exterior to facilitate removal of ice and snow therefrom to permit use of a vehicle with resulting clear windshield visibility.

2. Background Art

Those who reside in or travel through regions which experience cold winters, are well aware of the inconvenience of having to clear a vehicle's windshield of accumulated ice and snow before the vehicle can be driven. This problem is particularly difficult on freezing mornings after a night of rain or sleet has left a thick coating of ice on the external surface on a vehicle's windshield. Typically, it is necessary to use one or more special tools to scrape and chip away such ice coatings before the visibility through the windshield can be made sufficiently clear to permit a vehicle operator to drive the vehicle safely. It would be extremely useful to provide an apparatus which obviates such an inconvenience such as by preventing the accumulation of ice and snow on a windshield.

There are prior art patents which disclose such an apparatus. By way of example, U.S. Pat. No. 2,599,066 to Osborn discloses a windshield cover that is secured by suction cups to protect against rain, snow and freezing action. U.S. Pat. No. 2,690,928 to Boynes discloses a windshield cover to protect against the accumulation of sleet, ice and snow. U.S. Pat. No. 3,046,048 to Cheney discloses a windshield cover comprising plastic sheets held in place by magnets. U.S. Pat. No. 5,037,156 to Lundberg discloses a windshield protector formed of a layer of polyethylene to protect against frost and snow and having wings to be secured within the vehicle by the vehicle doors. U.S. Pat. No. 5,615,923 to Madison discloses a windshield cover secured by Velcro and having buckled straps to secure it from theft.

All such devices should preferably be light, low cost, foldable, relatively easy to deploy on a windshield and to stow when not in use, resistant to theft as well as to wind, and most importantly, should be easy to remove from a windshield even after several days of use in a wet, cold, icy environment. Moreover, it should be made of a material which will not be frozen to a windshield or from which snow or ice would adhere and thus be difficult to remove. The requirement for a light weight and foldable device, makes any solid material unsuitable. The requirement for a wind and theft resistant device makes the use of fabric-only designs unsuitable because they would be easily stolen with even securing belts being susceptible to being cut or torn. The requirement for being resistant to being frozen to the windshield or to resist being adhered to ice or snow, makes most known materials, whether solid or fabric, unsuitable for use in such windshield protection devices.

Based upon the foregoing, it is believed that none of the aforementioned prior art issued patents describes a windshield cover which meets all of the stated requirements. Therefore, there appears to still be a need for a windshield cover which meets all of the indicated objectives in a commercially viable product which can be readily manufactured and marketed at a reasonable price.

SUMMARY OF THE INVENTION

The present invention, in its preferred embodiment, provides a windshield protection and ice removal device which meets each and every one of the aforementioned requirements. It is lightweight, low cost, foldable, easy to deploy and stow, resistant to theft on a windshield and does not freeze to a windshield or permit ice and snow to adhere to it.

The preferred embodiment comprises a pair of generally rectangular flexible wire frames enclosed by and supporting a nylon fabric coated by an outer layer of polyvinyl chloride. There are also a pair of opposed side view mirror "gloves" having expandable "wrists" and which are designed to enclose a vehicle's side view mirrors for securing the invention to the vehicle in a manner resistant to wind effects which might otherwise lift the cover from the windshield. Finally, the preferred embodiment also comprises a wire-connected belt terminating in a buckle which is designed to be trapped inside a vehicle's interior by the vehicle's door or side window to render the invention resistant to unauthorized removal from the vehicle's windshield. A relatively thick, cut-resistant wire runs through the belt to make it more difficult to cut the belt and sever it from the rest of the shield device.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 2 is an elevational view of the embodiment of FIG. 1;

FIG. 3 is an enlarged cross-sectional view taken in the direction shown in FIG. 2;

FIG. 4 is an enlarged view of the glove-portion of the preferred embodiment;

FIG. 5 is a view of the preferred embodiment shown in a partially folded condition;

FIG. 6 is a view of the preferred embodiment shown in a more fully folded condition;

FIG. 7 is a view of the preferred embodiment shown fully folded and being placed into a storage bag; and FIG. 8 is a view of the fully folded and fully bagged configuration of the present invention.

DETAILED DESCRIPTION OF THE PREFERRED EMBODIMENT

Figure 1:
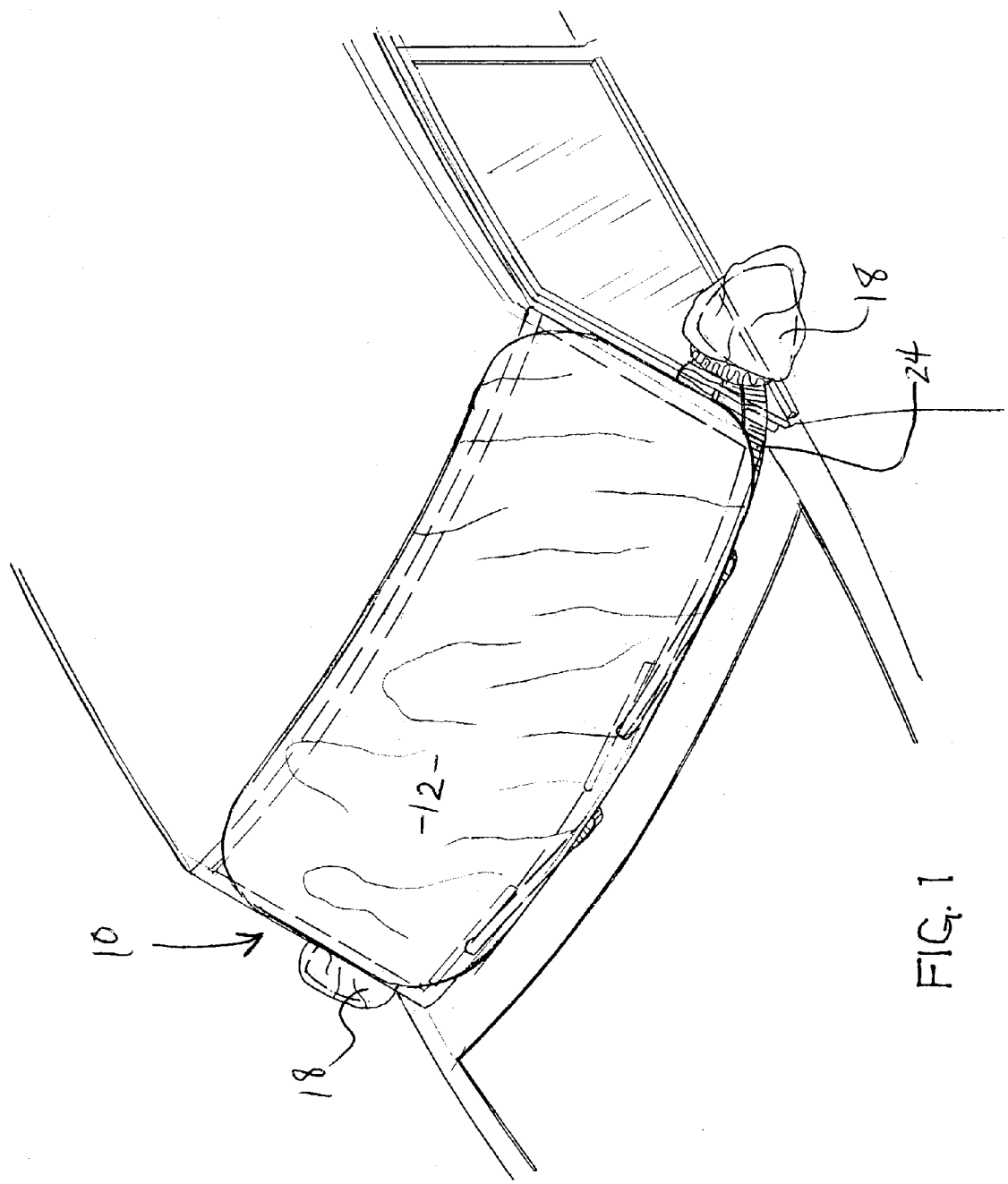
FIG. 1 is a three-dimensional view of a preferred embodiment of the present invention shown deployed on a windshield of a vehicle.

Referring to the accompanying figures, it will be seen that an ice shield 10 is designed to substantially overlie a vehicle windshield with a substantially rectangular cover 12 while being secured at its respective sides to the vehicle's side view mirrors by respective mirror gloves 18 and being locked into the vehicle interior by a lock-strap 24.

As seen best in FIG. 2, cover 12 comprises a pair of side by side flexible wire frames 14 and 16 which are enclosed by a unitary fabric cover 15. Cover 15 is preferably made of nylon coated with polyvinyl chloride (PVC), a coated fabric that repels water and is commonly used to fabricate rain coats.

A pair of "gloves" 18 having respective expandable "wrists" 20 extend from respective attachments 22 at the respective opposed sides of the cover 12. Gloves 18 are shaped to securely enclose a vehicle's side view mirrors as shown best in FIG. 4.

A lock-strap 24 extends from a corner of cover 12. Strap 24 terminates in a buckle 25. A heavy cut-resistant, flexible wire 26 runs through straps 25, attaches at one end to buckle 25 and at its other end to frame 16 inside cover fabric 15. To lock ice shield 10 into a vehicle in its deployed condition, buckle 25 is placed inside the vehicle with the vehicle side windows closed and the vehicle doors locked so that the buckle 25 cannot be removed.

FIGS. 5 through 8 illustrate in sequence how the shield 10 is folded for being stowed in a vehicle or its trunk. The first step shown in FIG. 5 comprises folding frame 14 over frame 16 to form a smaller rectangle with gloves 18 therebetween. Then the two frames are folded together again into a more circular shape and slipped disk-like into a bag 30. It will be apparent that these steps are reversed in sequence to deploy shield 10 into the configuration of FIG. 2.

It will now be understood that the preferred embodiment disclosed herein is low cost, lightweight, easy to deploy and to stow, is theft and wind resistant on a vehicle and, most importantly, because it uses a water repellant fabric (i.e., nylon coated with PVC) it will not be frozen onto the windshield or permit ice to adhere to it. Having thus disclosed an exemplary version of the invention, it will be apparent that various modifications may be made. For example, other materials, shapes and dimensions are readily implemented for different windshield shapes and the like. Therefore, the scope hereof will be limited only the appended claims and their equivalents.

I claim:

1. An ice shield device for protecting vehicle windshields against an accumulation of ice; the device comprising:
   a pair of contiguous rectangular co-planar wire frames that are shaped to coincide with at least a portion of a vehicle windshield perimeter, said frames being sufficiently flexible to be folded into a non-planar configuration for stowing said device;
   a fabric cover enclosing said frames, said cover being made of at least one material that is water repellant; and
   at least one glove-shaped attachment extending from said cover and configured for selectively enclosing a side view mirror of a vehicle for securing said device to said vehicle.

2. The device recited in claim 1 wherein said fabric cover comprises nylon.

3. The device recited in claim 2 wherein said nylon fabric cover is coated with a water repellant.

4. The device recited in claim 3 wherein said water repellant is polyvinyl chloride.

5. The device recited in claim 1 further comprising a security strap extending from said frames and having a free end terminating in a buckle for being enclosed within said vehicle with said device deployed on the windshield of said vehicle.

6. The device recited in claim 5 wherein said strap comprises a cut-resistant wire attached to said frame and extending to said buckle.

7. An ice shield device for protecting the exterior surface of a vehicle's windshield against ice; the device comprising:
   a pair of contiguous rectangular co-planar wire frames shaped to substantially coincide with said windshield, said frames being sufficiently flexible to be folded;
   a fabric cover enclosing said pair of frames; and
   at least one glove-shaped attachment extending from said cover and configured for overlying and enclosing a side view mirror adjacent said windshield.

8. The device recited in claim 7 wherein said fabric cover comprises nylon.

9. The device recited in claim 8 wherein said fabric cover is coated with a water repellant.

10. The device recited in claim 9 wherein said water repellant is PVC.

11. The device recited in claim 7 further comprising a security strap extending from said frame and having a free end terminating in a buckle for being enclosed within said vehicle with said device deployed on the windshield of said vehicle.

12. The device recited in claim 11 wherein said strap comprises a cut-resistant wire attached to said frames and extending to said buckle.

13. An ice shield device for overlying the exterior surface of a vehicle windshield for protecting the windshield against ice and for quickly removing any ice that has accumulated on the device; the device comprising:
   a pair of contiguous co-planar rectangular wire frames covered by a water repellant fabric; said frames being sufficiently pliable to be folded.

14. The device recited in claim 13 further comprising at least one glove-shaped attachment configured for enclosing a side view mirror of said vehicle.

15. The device recited in claim 13 further comprising a tethered strap having a buckle at a free end for locking said device to said vehicle.

\* \* \* \* \*